United States Patent [19]
Vansnick

[11] Patent Number: 5,433,183
[45] Date of Patent: Jul. 18, 1995

[54] CONNECTION SYSTEM FOR CONNECTING A PIPE CARRYING A HOT FLUID TO A PLASTIC MEMBER AND ITS USE IN AN INTERNAL COMBUSTION ENGINE

[75] Inventor: Michel Vansnick, Wemmel, Belgium

[73] Assignee: Solvay (Société Anonyme), Brussels, Belgium

[21] Appl. No.: 262,632

[22] Filed: Jun. 20, 1994

[30] Foreign Application Priority Data

Jun. 25, 1993 [FR] France ............... 93 07884

[51] Int. Cl.⁶ .................................. F02M 25/07
[52] U.S. Cl. ...................... 123/568; 285/47; 285/158; 285/211; 285/305; 285/906; 285/918
[58] Field of Search ............ 285/211, 47, 54, 177, 285/305, 374, 158, 906, 918; 123/568

[56] References Cited

U.S. PATENT DOCUMENTS

| | | | |
|---|---|---|---|
| 744,646 | 11/1903 | Tietz | 285/211 |
| 2,935,343 | 5/1960 | Ellis | 285/374 X |
| 3,275,345 | 9/1966 | Waldron et al. | 285/47 |
| 4,331,338 | 5/1982 | Caldwell et al. | |
| 4,415,184 | 11/1983 | Stephenson et al. | 285/47 |
| 4,524,995 | 6/1985 | Bartholomew | 285/54 |
| 4,884,829 | 12/1989 | Funk et al. | 285/305 X |
| 4,938,510 | 7/1990 | Gmeiner et al. | 285/305 X |

FOREIGN PATENT DOCUMENTS

| | | | |
|---|---|---|---|
| 768 | 7/1968 | Australia | 285/305 |
| 637028 | 12/1962 | Belgium . | |
| 2693252 | 7/1994 | France . | |
| 1525525 | 7/1969 | Germany | 285/305 |
| 9002341 | 5/1990 | Germany . | |
| 2268238 | 1/1994 | United Kingdom | 285/305 |
| 9015240 | 12/1990 | WIPO . | |

*Primary Examiner*—Dave W. Arola
*Attorney, Agent, or Firm*—Spencer, Frank & Schneider

[57] ABSTRACT

A sealed connection system for connecting a pipe carrying a hot fluid to a plastic member. The plastic member has a wall having an orifice extending therethrough. The sealed connection includes an internal projection formed in the wall and projecting into the orifice, and an annular seal lining the internal projection. The connection further includes a lip positioned on an exterior surface of the wall and at least partially surrounding the orifice. Also provided is a heat shield bell fastened to the pipe and having a flared portion. The flared portion has an external flange bearing on the annular seal. The bell is insertable into the orifice. Further, the connection includes a pin insertable into the lip for fixing the external flange against the annular seal.

10 Claims, 5 Drawing Sheets

CONNECTION SYSTEM FOR CONNECTING A PIPE CARRYING A HOT FLUID TO A PLASTIC MEMBER AND ITS USE IN AN INTERNAL COMBUSTION ENGINE

BACKGROUND OF THE INVENTION

The present invention relates to a connection system for connecting a pipe carrying a hot fluid to a plastic member containing or carrying a fluid at a substantially lower temperature. It also relates to the use of such a system in an internal combustion engine.

In numerous industrial applications it is necessary to inject a hot fluid into a fluid at a substantially lower temperature carried by a plastic member. Such a situation poses a problem as regards the temperature stability of the plastic member at the place where the pipe carrying the hot fluid is connected thereto.

A problem of this type is especially encountered in the design of internal combustion engines enabling the quantity of polluting exhaust gases emitted to be reduced. From this standpoint, one solution consists, in fact, in subjecting part of the exhaust gases to recirculation in the combustion chamber or chambers in the engine, thereby making it possible to complete their combustion and thus to reduce the quantity of pollutants emitted.

In order to implement this solution, it is necessary to equip the engine with a pipe which takes part of the exhaust gases back towards the inlet manifold. Given the high temperature of the exhaust gases, usually of the order of several hundred degrees, a metal pipe (generally designated by "EGR pipe"—Exhaust Gas Recirculation) is often used for this purpose. On the other hand, the inlet manifolds of combustion engines are not subjected to high temperatures and are more and more frequently made of plastic.

However, it is clear that problems arise when it is desired to connect an EGR pipe, heated to several hundred degrees, to a plastic member. Part of the solution to this problem, known already, consists in making the connection via a metal bell, through which the pipe passes, acting as a heat shield between the EGR pipe in which the hot gases flow and the wall of the plastic manifold, at the place where the pipe penetrates into the manifold.

However, it is necessary to connect, firmly and in a sealed manner, the EGR pipe to the inlet manifold.

A known connection system consists in fixing the abovementioned bell, via threaded metal inserts embedded in the wall thickness of the manifold, by screws passing through lateral eyelets fixed to the bell or forming part thereof. However, this system constitutes a solution of little advantage. The reason for this is that it comprises numerous components, several operations (and as many screws) are involved in (un) fitting it, and it requires the use of a tool. The presence of metal inserts within the manifold furthermore complicates its manufacture and its subsequent possible recycling.

The connection system chosen must consequently comply with many requirements. Thus, it must, especially, ensure sealing, even at high temperatures, and preferably must be simple to (un)fit, that is to say requiring no special tool nor the application of a large force. In order for it to be usable in particular on small engines, it should furthermore take up little room. It is also advantageous for it to be able to be applied to cylindrical pipes and also to pipes of different cross-sections.

Generally, it is also desired to be able to connect the pipe to the plastic member without having to rotate it, this rotation being likely to be difficult to achieve because the other end of the pipe is rigidly fixed, or because of an elbow or elbows which the pipe may comprise. Finally, it is desirable that the system chosen be composed of few components, so as to simplify its implementation and to reduce its cost.

The same requirements are generally imposed in industrial applications other than that of exhaust gas recirculation in internal combustion engines.

SUMMARY OF THE INVENTION

The present invention consequently aims to provide a sealed connection system which is simple, takes up little room and is easy to (un)fit.

More specifically, the invention relates to a sealed connection system for connecting a pipe carrying a hot fluid to a plastic member, in which the connection is achieved via an external bell fixed to the pipe, serving as a heat shield and inserted into an orifice made in the wall of the member, which is characterized in that:
 (a) the orifice comprises an internal projection lined with an annular seal and is surrounded, on the outside, at least partially, by a lip;
 (b) the widest part of the bell is provided with an external flange bearing on the annular seal;
 (c) the external flange of the bell is applied against the annular seal by at least one pin inserted into the lip surrounding the orifice.

The fact that sealing is ensured radially is particularly advantageous, since possible axial play, due, for example, to the expansion or creep of certain components or parts of components of the system, has no effect on its sealing. Furthermore, whilst excluding any play, the axial immobilization of the bell is ensured, on either side, by an element possessing a certain elasticity (the pin or pins on one side and the annular seal on the other), this being advantageous as regards vibration damping. This advantage is particularly significant in the particular case of the connection of EGR pipes, since these are not only subjected to vibrations from the engine but, in addition, a pulsated gas flow is travelling through them.

The appended figures show, in a non-limiting manner, various embodiments of the connection system of the invention and illustrate its operation and its advantages.

DETAILED DESCRIPTION OF A PREFERRED EMBODIMENT

Figure 1A:
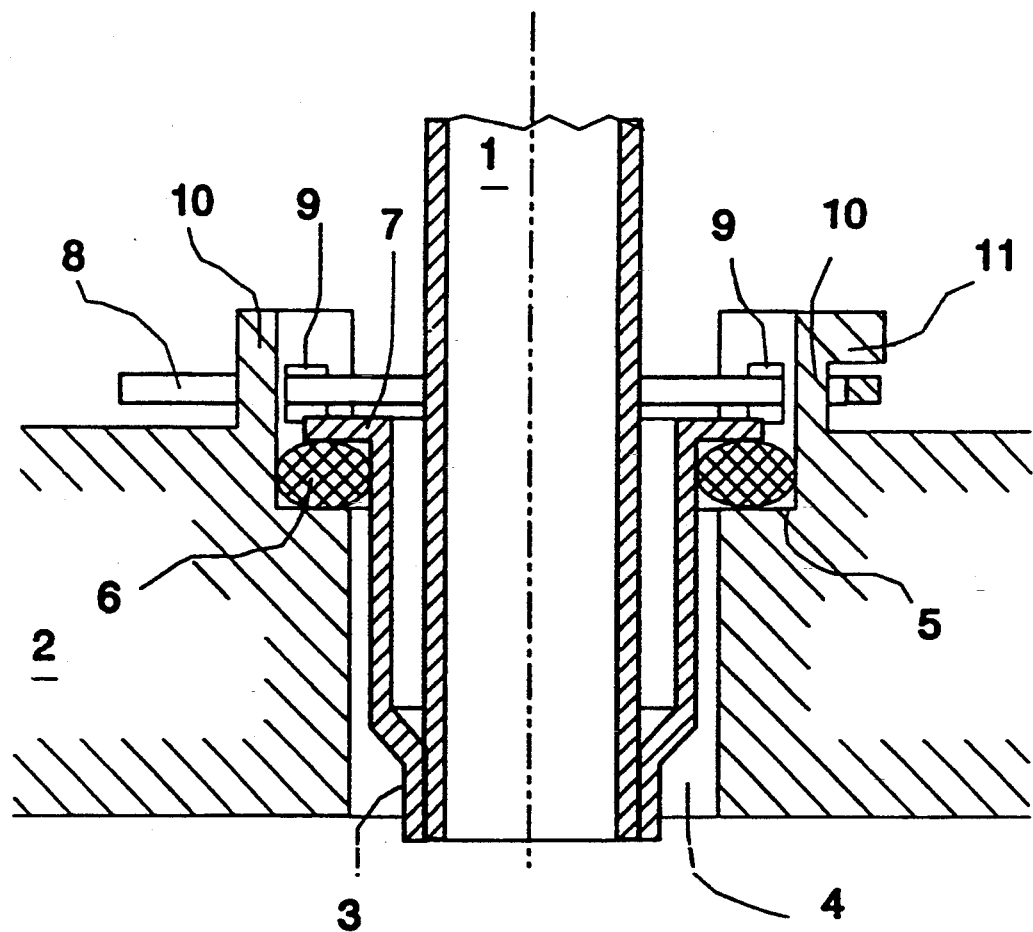
FIGS. 1a and 1b show the same embodiment of the connection system of the invention, one in section (FIG. 1a) and the other seen axially from the outside of the member (FIG. 1b).
Figure 1B:
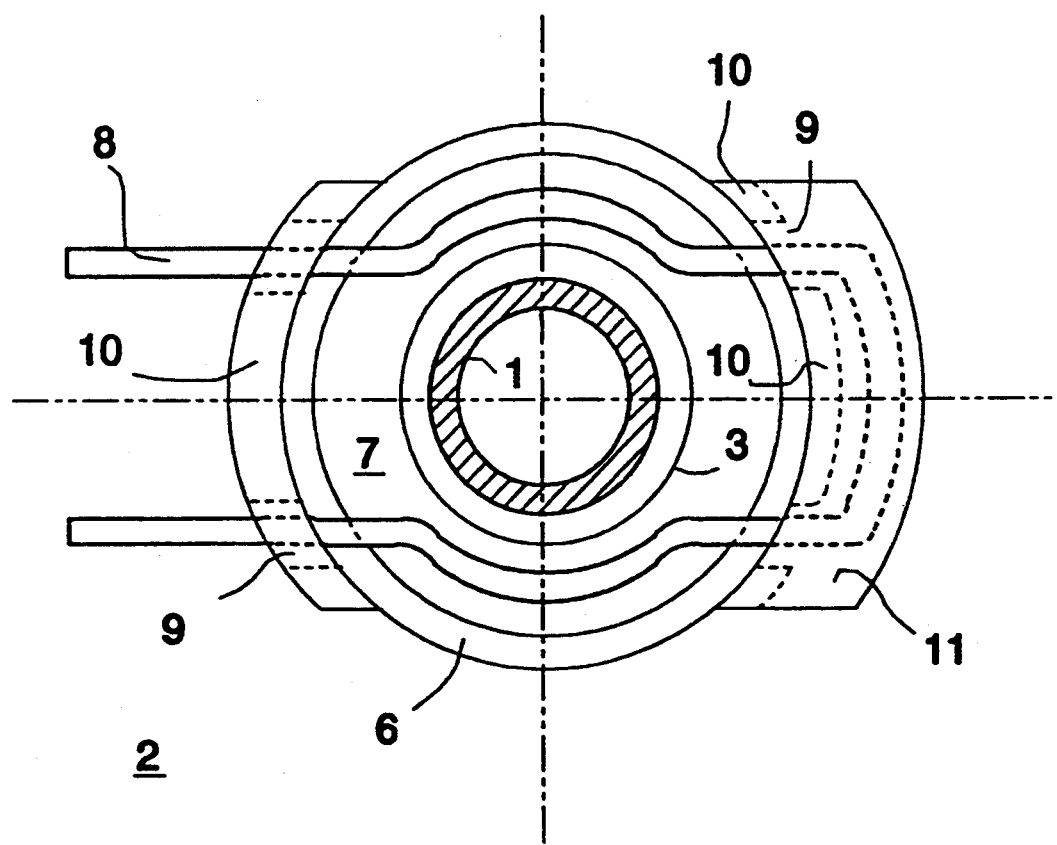
Figure 2:
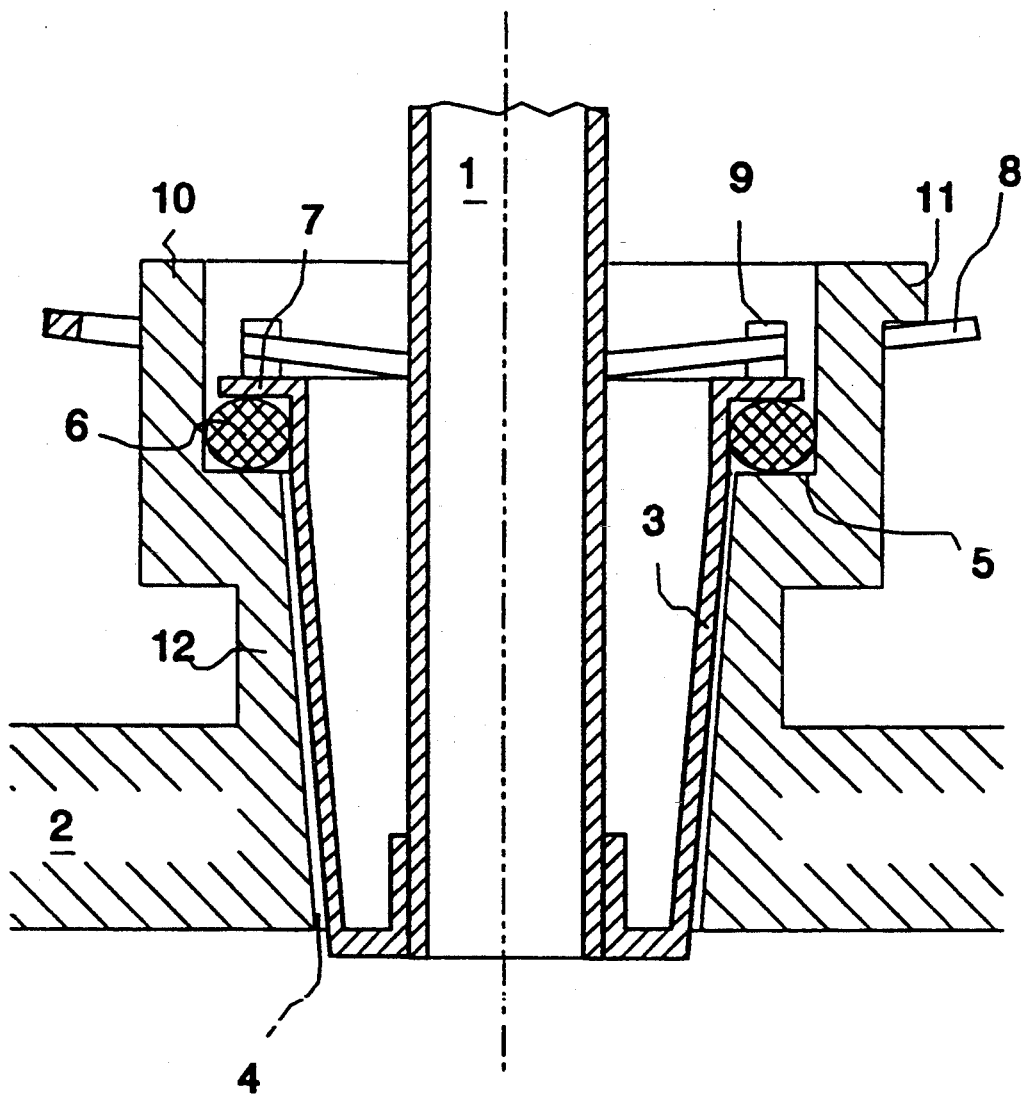
FIG. 2 shows, in section, another embodiment.

In FIGS. 1a, 1b and 2 a pipe (1) is illustrated the end of which is fitted with a bell (3). Also shown is the wall of a plastic member (2), the inside of which is assumed to be located towards the bottom and in which an orifice (4) is made.

The materials forming the pipe (1) and its bell (3) may be any materials. In practice since the subject of the invention is a connection system for a pipe carrying a hot fluid, materials are chosen, however, for these elements, which are capable of withstanding the temperature of the fluid flowing in the pipe, both from the mechanical standpoint and from that of corrosion. Advantageously, the pipe and the bell are, in whole or in part, formed from at least one metal. It is possible to use, equally well, a single metal or an alloy of two or more metals. As metal, stainless steel is preferably adopted. This choice is well suited for the EGR pipes, which must withstand temperatures of several hundred degrees and be the least thermally conductive as possible. The bell and the pipe are often formed from the same material, although this is not necessary. The bell is fixed to that end of the pipe inserted into the orifice, for example by welding or by brazing, in such a way that its widest part faces towards the end of the pipe or towards the opposite side.

Preferably, the bell is fixed in such a way that its widest part is facing towards the opposite side from that end of the pipe inserted into the orifice. In order for it to fulfil its role as a heat shield as far as possible, this bell preferably has a height (measured parallel to the axis of the orifice) at least equal to the depth of the orifice (4), that is to say to the wall thickness of the member (2) in line with the orifice (4).

Often, the pipe is cylindrical, as is the orifice to which it is to be connected, and all the components or parts of components, such as the bell, the annular seal, the internal projection of the orifice, etc., are axi-symmetric. This does not exclude the invention being able also to be applied to pipes whose cross-section is not circular, but oval or rectangular, for example; in such cases, all the other components or parts of components must, of course, be consequently modified.

According to one particular embodiment, shown in FIG. 2, the orifice (4) is prolonged by a short section of piping (12), generally forming an integral part of the member (2); such an embodiment may be useful in certain particular cases, for example if this results in better accessibility of the connection system. Another advantage of such an embodiment, particularly beneficial in cases where the hot fluid carried by the pipe has a very high temperature, is that it enables a taller bell to be used, the wider end of which is consequently raised to a lower temperature, by virtue of the increase in cooling by its lateral surface. In such a case, the bell preferably has a height at least equal to the total depth of the orifice (4), that is to say including the length of the section of piping (12). In the present description, the term orifice is used in the widest sense, as designating both the actual orifice and the inside of the possible short section of piping which prolongs it.

Advantageously, the common end of the pipe and of the bell extends substantially beyond the level of the wall of the member (2), inside the latter, so that the flow of the fluids flowing therein is not disturbed excessively. Such a situation is advantageous insofar as it enables the fluid at a moderate temperature, flowing in the member (2) to cool the end of the bell and of the pipe better and thereby reduce the heat transfer from the pipe to the bell and, therefore, to the member (2).

Within the scope of the present invention, the member (2), containing or carrying a fluid at moderate temperature, may be made of any plastic, or else a blend of two or more different plastics. The term plastics is meant to denote both thermoplastic and thermosetting plastics. However, thermoplastics are preferred. One or more of these plastics may possibly contain one or more known additives, such as pigments, stabilizers, process aids, reinforcing fibres or inorganic fillers. In the particular case of inlet manifolds of internal combustion engines, plastics having good thermomechanical properties are generally used, for example those based on polyamides or on poly(phenylene sulphide). However, these examples of materials are not limiting.

The orifice (4) made in the wall of the member (2) and the bell (3) preferably have corresponding shapes and sizes, which enables especially the bell to be inserted into the orifice. By way of examples, the bell (3) and the orifice (4) may have a cylindrical shape, as illustrated in FIG. 1a, or conical, as illustrated in FIG. 2.

During connection, it is necessary to limit the extent to which the bell is pushed into the member (2). For this purpose, in accordance with the invention, an internal projection (5) is arranged in the orifice (4) in such a way that the diameter of the orifice is greater on the exterior side than towards the inside of the member (2), and the wider end of the bell (3) is provided with an external flange (7). The internal projection (5) generally has an annular surface, which is substantially plane and perpendicular to the axis of the orifice (4), opposite which may be arranged the external flange (7) of the bell (3), this external flange also being substantially plane and perpendicular to the axis of the orifice (4). However, both these annular surfaces do not come directly into contact, but are separated by an annular seal (6) bearing thereon.

This annular seal is generally formed by an elastic material having a sufficient temperature resistance, for example a fluoroelastomer. The role of this annular seal is to ensure, radially, sealing between the bell (3) and the plastic member (2). It is therefore advisable for its inside diameter to be slightly less than the outside diameter of the bell just beneath its external flange (7) and that its outside diameter is slightly greater than the diameter of the first section of the orifice (4), that is to say that section of the orifice extending on its internal projection (5) towards the outside of the member (2). Thus, sealing remains guaranteed even in the case of slight axial play between the pipe (1) fitted with its bell (3) and the member (2). A standard shape of annular seal, particularly suitable for this function, is the O-ring seal. However, the annular seal may have a different cross-section, for example an oval, rectangular or other cross-section.

In addition to this radial sealing function, the annular seal (6) also serves as an axial bearing surface for the external flange (7) of the bell; it is therefore advisable for the maximum outside diameter of the external flange (7) to be greater than the diameter of the second section of the orifice, that is to say of that section of the orifice which follows, facing the inside of the member (2), the first section as defined hereinabove. In order to prevent the external flange (7) coming into direct contact with the member (2), which could cause temperature stability problems for its constituent material, it is furthermore preferred that the maximum outside diameter of this flange is less than the diameter of the first section of the orifice (4).

A third function of the annular seal (6) is to centre the bell (3) with respect to the orifice (4), that is to say to prevent any contact between the lateral wall of the bell and the wall of the orifice and, consequently, to avoid problems of deformation or thermal degradation of the wall of the member (2).

This centring effect may be further improved by the presence, over at least part of the wall of the orifice (4), of protuberances having, for example, the shape of spikes or of ribs parallel to the axis of the orifice.

With a view to immobilizing the bell (3) firmly with respect to the member (2), one or more pins (8) are used which are inserted into the lip (10) surrounding, at least partially, the orifice (4). The term pin is meant to denote an elongated component of high rigidity, for example formed by a section of rigid metal wire. A standard embodiment consists in using a single pin, although making use of several pins is in no way excluded.

At least one of the pins (8) may advantageously be given the shape of a U, the separation of the two branches of this U preferably being less than the diameter of the external flange (7) of the bell. Furthermore, the central portion of at least one of the pins used is advantageously deformed so as to give it approximately the shape of an arc of a circle contained in a plane substantially parallel to the external flange (7) of the bell, as illustrated, for example, in FIG. 1b. Such a shape makes it possible to increase the area of contact between the pin and the external flange (7) of the bell. Furthermore, if the pin and the lip (10) are designed suitably with respect to each other, such a shape also makes it possible to limit, by a clipping effect, any accidental movement of the pin (8) perpendicular to the axis of the orifice.

Whatever the number of pins used, it is advisable to give each pin a shape such that it is sufficiently remote from the pipe (1) in order to avoid excessive heat transfer from the pipe to the pin and, consequently, from the pin to the lip (10). Excessive heating of that part of the lip on which the pin bears could, in fact, lead especially to problems of creep or of thermal degradation of the constituent plastic of the lip.

It is also possible to give the pin (8) a shape which is very slightly inwardly curved at its centre, as shown in FIG. 2, so that it essentially exerts a vertical thrust on the external flange (7) of the bell at its centre, or in the centre of each of its branches in the case of a U-shaped pin. The slight flexibility of the pin, combined with the elasticity of the annular seal (6), thus makes it possible to compensate for slight axial play or creep.

The pin (8) may have any cross-section, for example a circular, rectangular or oval one. However, it is desirable, with a view to as homogeneous a distribution as possible of its pressure, that its cross-section has two substantially rectilinear opposed sides, at least at the locations where the pin comes into contact with other elements. Preferably, it is given a cross-section in the form of a flattened circle, a rectangle or an I-beam, which withstands bending particularly well. In a particularly preferred manner, the pin has a substantially rectangular cross-section. In practice, the average dimensions of the cross-section of the pin are generally of the order of one millimetre.

With the aim of immobilizing the pin (8) axially, and therefore indirectly the bell and the pipe, with respect to the member (2), provision is made in the lip (10) for one or more retention elements on which the pin bears. These retention elements generally consist of cut-outs (9) into which the pin engages. According to one embodiment, the lip (10) is continuous. Since its role is solely to offer an axial bearing surface to the pin (8) at the point where the latter passes through it, it may, however, be satisfactory to provide lip portions only at the locations of passage of the pin, as illustrated in FIGS. 1a and 1b. The term lip is meant hereafter in the widest sense, as designating both a continuous lip extending over 360° and one or more lip portions extending only over a fraction of the periphery of the orifice (4). When the orifice (4) is prolonged by a short section of piping (12), as illustrated in FIG. 2, the lip simply prolongs this section of piping towards the outside of the member (2). Whether such a section of piping is present or not, the lip (10) advantageously comprises, at least over a portion of its periphery, an external flange (11) contained in a plane perpendicular to the axis of the orifice (4).

Figure 3:
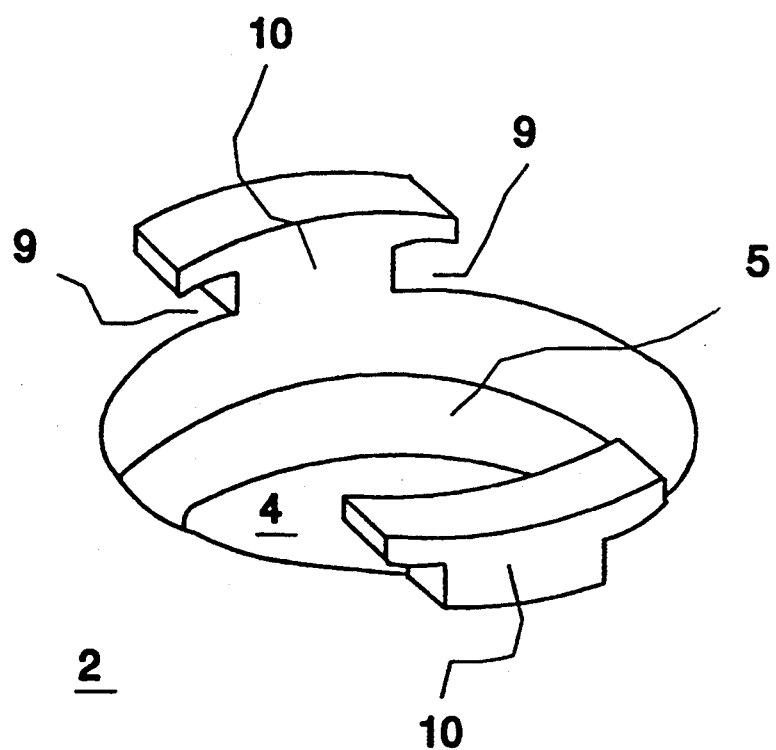
FIGS. 3 and 4 each show, in perspective, an orifice (4) made in the wall of a member (2), partially surrounded on the outside by a lip (10).
Figure 4:
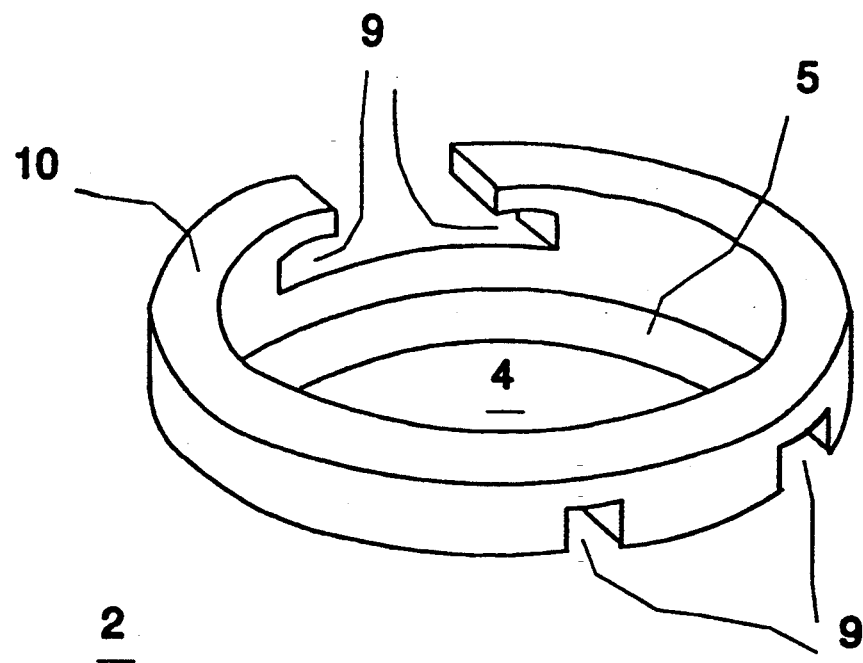

The cut-outs (9) made in the lip (10), through which the ends of the pin (8) pass, may or may not be orifices passing through the lip along axes contained in a plane perpendicular to the axis of the orifice (4), as illustrated, for example, in FIGS. 1a, 1b and 2. These cut-outs may also be open on their side, and delimited, as illustrated in FIG. 3, by flanges prolonging laterally the top of the lip portions. This embodiment is particularly advantageous as regards the manufacture of the member (2), no drilling step being necessary. These two types of cut-outs may possibly be combined, as illustrated in FIG. 4.

Whatever the type or types of cut-outs chosen, their position, their shape and their dimensions must, of course, be such that they enable the pin to be inserted, and that, once the pin (8) is in place, the latter exerts, on the external flange (7) of the bell, due to the effect of the elasticity of the annular seal (6), a pressure sufficient to immobilize, axially, the bell (3) with respect to the member (2).

In particular, the lower sides of these cut-outs (that is to say the sides closest to the end of the pipe) are generally all located in the same plane perpendicular to the axis of the orifice (4), as are their upper sides, so that the pin adopts a position parallel to the external flange (7) of the bell once it is slid into the cut-outs (9).

When the lip comprises an external flange (11), the lower face of the latter lies advantageously level with the upper sides of the cut-outs (9), thereby enabling the contact area between the pin and the lip to be increased.

The presence of such a flange (11) of the lip has several advantages: thus, it may, especially, protect the pin from possible dirt and reduce the risk that it is accidentally moved during an intervention on a neighbouring member. If the flange is suitably shaped and sized, it may also serve to verify, visually, the correct positioning of the pin, for example if the latter is totally concealed only once completely in place.

Furthermore, the length of the first section of the orifice is such that, once the annular seal (6) is arranged in contact with the internal projection (5), and once the bell (3) is inserted into the orifice (4) and put into contact with this annular seal, the upper edge of the external flange (7) of the bell (that is to say its face remotest from that end of the pipe inserted into the orifice) extends beyond (axially and towards the outside of the member (2)) the level of the lower sides of the cut-outs and ends at some distance from the level of the upper sides of the cut-outs (9) made in the lip less than the thickness of the pin (8), otherwise the latter could exert no pressure on the external flange of the bell. Likewise, it is desirable that no excessive force be necessary with a view to bringing the upper edge of the external flange (7) of the bell sufficiently beneath (in the direction of the member (2)) on the upper side of the cut-outs (9) in order to enable the pin to be inserted, so that this operation does not require the use of tools.

In the cases where it is desired to obtain a connection system which is very compact, the cut-outs (9) are preferably arranged in such a way that their lower sides are contained in the plane of the external wall of the member (2), as illustrated in FIGS. 3 and 4, thereby minimizing the axial space requirement of the system.

The lip (10) is advantageously arranged at the very edge of the orifice (4), thereby enabling the length of the pin (8) to be decreased and, consequently, its rigidity to be increased.

As far as possible, the lip is designed in such a manner that it can be fashioned during the manufacture of the member (2), which is achieved by techniques known to the person skilled in the art, generally by injection moulding. If the complexity of the component requires it, it may, however, be advantageous that the lip forms part of an insert produced separately, using a substance different from that from which the major part of the member (2) is formed. Thus, it is possible to manufacture, in a first step, for example by injection, a component comprising the lip (10) and at least part of the contour of the orifice (4), and then to use, in a second step, this component as an insert during the formation of the member (2). This insert must thermally withstand the second manufacturing step; it is therefore preferable to produce it using a substance having superior thermomechanical properties than that forming the rest of the member (2). For this purpose, it is possible to use a plastic or a metallic substance. The use of a plastic is advantageous from the standpoint of recycling. The plastic may, especially, be chosen from polymers based on poly(phenylene sulphide) or polyamides and may, possibly, contain known additives, such as those mentioned previously.

The use of such an insert is also advantageous for the intended purpose, since it is precisely the elements adjacent to the orifice (4) which are the most highly stressed from the thermomechanical standpoint. By way of a particular embodiment, this insert comprises at the same time the contour of the orifice (4), its internal projection (5), the possible short section of piping (12) which prolongs the orifice, and the lip (10).

The implementation of the connection system according to the invention is particularly simple: it suffices to insert the end of the pipe fitted with its bell (3) into the orifice (4), the internal projection (5) of which has been lined beforehand with the annular seal (6), then, by exerting a slight axial pressure on the pipe, to slide the pin (8) through the cut-outs (9) made in the lip (10). By releasing the axial pressure exerted on the pipe, the seal (6), due to the effect of its elasticity, applies the external flange of the bell (7) against the pin (8), as well as the latter against the upper sides of the cut-outs (9) made in the lip (10), thereby immobilizing the pipe and the bell with respect to the member (2). As with unfitting, which just reduces to reversing these steps, this fitting procedure requires no special tool, nor the use of large forces.

The subject of the invention is also the use of a connection system such as described hereinabove for connecting, in an internal combustion engine, an exhaust gas recirculation pipe to a plastic inlet manifold.

I claim:

1. A sealed connection system for connecting a pipe carrying a hot fluid to a plastic member, said plastic member having a wall including an orifice extending therethrough, said connection comprising:
    an internal projection formed in the wall and projecting into the orifice;
    an annular seal lining said internal projection for sealing thereagainst;
    a lip positioned on an exterior surface of the wall and at least partially surrounding the orifice;
    a heat shield bell sealingly fastened to the pipe and having a flared portion comprising an external flange bearing on said annular seal, said bell and pipe being insertable into the orifice with said seal at least sealingly engaging said bell and said internal projection; and
    at least one pin means insertable into said lip for fixing said external flange against said annular seal.

2. A sealed connection system as defined in claim 1, wherein said bell is fixed to a terminal end of the pipe so that said bell and the pipe terminal end are insertable into the orifice together, said flared portion being positioned towards the exterior surface of the plastic member away from the pipe end.

3. A sealed connection system as defined in claim 1, wherein the pipe and said bell comprise one metal.

4. A sealed connection system as defined in claim 1, wherein said pipe and said bell each have a common end insertable into the orifice, said common end extending through said orifice substantially beyond the plastic member wall and into a space defined by the plastic member.

5. A sealed connection system as defined in claim 1, wherein said pin has a U-shape.

6. A sealed connection system as defined in claim 5, wherein said pin has an arc-shaped central portion.

7. A sealed connection system as defined in claim 1, wherein said pin has a substantially rectangular cross-section.

8. A sealed connection system as defined in claim 1, wherein said lip has an external flange extending around at least a portion of a periphery of said lip, said lip external flange being in a plane perpendicular to an axis of the orifice.

9. A sealed connection system as defined in claim 1, wherein said plastic member comprises a first substance; further comprising an insert separately composed of a second substance, said insert including said lip.

10. A sealed connection system for connecting an exhaust gas recirculation pipe carrying a hot fluid to a plastic inlet manifold in an internal combustion engine, said plastic inlet manifold having a wall including an orifice extending therethrough, said connection comprising:
    an internal projection formed in the wall and projecting into the orifice;
    an annular seal lining said internal projection for sealing thereagainst;
    a lip positioned on an exterior surface of the wall and at least partially surrounding the orifice;
    a heat shield bell sealingly fastened to the exhaust gas recirculation pipe and having a flared portion comprising an external flange bearing on said annular seal, said bell and pipe being insertable into the orifice with said seal at least sealingly engaging said bell and said internal projection; and
    at least one pin means insertable into said lip for fixing said external flange against said annular seal.

* * * * *